United States Patent
Aisaka et al.

(10) Patent No.: US 10,330,912 B2
(45) Date of Patent: Jun. 25, 2019

(54) IMAGE PROCESSING DEVICE AND IMAGE PROCESSING METHOD

(71) Applicant: SONY CORPORATION, Tokyo (JP)

(72) Inventors: Kazuki Aisaka, Kanagawa (JP); Shinji Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 171 days.

(21) Appl. No.: 15/036,846

(22) PCT Filed: Nov. 14, 2014

(86) PCT No.: PCT/JP2014/005733
§ 371 (c)(1),
(2) Date: May 16, 2016

(87) PCT Pub. No.: WO2015/079640
PCT Pub. Date: Jun. 4, 2015

(65) Prior Publication Data
US 2016/0299330 A1   Oct. 13, 2016

(30) Foreign Application Priority Data
Nov. 28, 2013 (JP) .................................. 2013-245891

(51) Int. Cl.
*H04N 9/47* (2006.01)
*H04N 7/18* (2006.01)
(Continued)

(52) U.S. Cl.
CPC ............ *G02B 21/367* (2013.01); *G02B 21/16* (2013.01); *G06K 9/0014* (2013.01); *G06K 9/00147* (2013.01)

(58) Field of Classification Search
USPC .......................... 348/79; 386/278, 280, 282
See application file for complete search history.

(56) References Cited

U.S. PATENT DOCUMENTS 4,733,295 A * 3/1988 Hemsky .................. H04N 9/64
                                                            348/577
7,424,204 B2 * 9/2008 Nakamura ........ G06F 17/30843
                                                            348/700
(Continued)

FOREIGN PATENT DOCUMENTS

EP        2034348 A    3/2009
EP        2199776 A    6/2010

OTHER PUBLICATIONS

International Search Report received for PCT Application No. PCT/JP2014/005733, dated Feb. 16, 2015, 4 pages.
(Continued)

*Primary Examiner* — Daquan Zhao
(74) *Attorney, Agent, or Firm* — Chip Law Group

(57) ABSTRACT

An image processing device and image processing method are provided. A device for controlling display of a sequence of images of living objects obtained through microscopy may comprise a processor and a storage unit. The storage unit may store a program which, when executed by the processor, causes the processor to perform acts. The acts may include acquiring a first sequence of first images of living objects obtained through microscopy. The acts may further include extracting a second sequence of second images from the first sequence of first images, wherein a number of second images in the second sequence is less than a number of first images in the first sequence. The acts may further include controlling a display device to display the second sequence of second images.

20 Claims, 11 Drawing Sheets

(51) Int. Cl.
*G02B 21/36* (2006.01)
*G02B 21/16* (2006.01)
*G06K 9/00* (2006.01)
*H04N 5/253* (2006.01)
*G11B 27/00* (2006.01)
*H04N 5/93* (2006.01)

(56) References Cited

U.S. PATENT DOCUMENTS

| | | | |
|---|---|---|---|
| 7,480,442 B2 * | 1/2009 | Girgensohn | G11B 27/034 |
| | | | 386/241 |
| 2001/0030802 A1 | 10/2001 | Ooki et al. | |
| 2005/0180580 A1 * | 8/2005 | Murabayashi | G11B 27/034 |
| | | | 381/81 |
| 2006/0171023 A1 | 8/2006 | Kishida | |
| 2007/0250898 A1 * | 10/2007 | Scanlon | G06K 9/00771 |
| | | | 725/135 |
| 2012/0314951 A1 * | 12/2012 | Okabe | G02B 21/365 |
| | | | 382/173 |

OTHER PUBLICATIONS

Written Opinion received for PCT Application No. PCT/JP2014/005733, dated Feb. 16, 2015, 7 pages.
International Preliminary Report received for PCT Application No. PCT/JP2014/005733, dated May 31, 2016, 8 pages.

* cited by examiner

| ROI No. | Coord (x, y) | Size(W × H) | Frame No. |
|---|---|---|---|
| 1 | (10, 15) | (20 × 22) | 1(1.tif) |
| 2 | (30, 133) | (34 × 18) | 2(2.tif) |
| ... | ... | ... | ... |

| ROI No. | Luminance change | Edge change | ... |
|---|---|---|---|
| 1 | 25 | ... | ... |
| 2 | 90 | ... | ... |
| ... | ... | ... | ... |

IMAGE PROCESSING DEVICE AND IMAGE PROCESSING METHOD

CROSS REFERENCE TO RELATED APPLICATIONS

This application is a U.S. National Phase of International Patent Application No. PCT/JP2014/005733 filed on Nov. 14, 2014, which claims priority benefit of Japanese Patent Application No. JP 2013-245891 filed in the Japan Patent Office on Nov. 28, 2013. Each of the above-referenced applications is hereby incorporated herein by reference in its entirety.

TECHNICAL FIELD

The present disclosure relates to an image processing device for processing an image captured by microscopy; and to an image processing method therefor.

BACKGROUND ART

Regarding time-lapse microscopy used to image living cells over a long time, there have been various improvements made in order to reduce time for observation when the photographed image (video) is to be observed.

In order to reduce time, there are some methods of analyzing the photographed cell image and calculating feature values. Examples of such techniques include techniques to recognize cells or the like by combining information of edge detection; contour extraction; filter processing, information of Z-axis direction; and the like (for example, see Patent Literatures 1 to 3 and Non Patent Literatures 1 to 3). According to such techniques, the regions in which the cells or the like are imaged would be classified, and a change in feature values with time would be output with respect to every classified region.

CITATION LIST

Patent Literature

[PTL 1] Japanese Patent Application Laid-open No. 2004-054347
[PTL 2] Japanese Patent Application Laid-open No. 2006-018394
[PTL 3] Japanese Patent Application Laid-open No. 2011-027543

Non Patent Literature

[NPL 1] "Cell Segmentation in Microscopy Imagery Using A Bag Of Local Bayesian Classifiers", Z. Yin, R. Bise, M. Chen and T. Kanade, 2010
[NPL 2]"High-resolution cell outline segmentation and tracking from phase-contrast microscopy images", M. E. Ambuhl, C. Brepsant, J.-J. Meister, A. B. Verkhovsky and I. F. Sbalzarini, 2011, Journal of Microscopy, Vol. 245, Pt 2 2012, pp. 161-170
[NPL 3] "Advanced Level-Set Based Multiple-Cell Segmentation and Tracking in Time-Lapse Fluorescence Microscopy Images", O. Dzyubachyk, W. Niessen and E. Meijering, 2008

SUMMARY

According to an aspect of the present disclosure, an apparatus for controlling display of a sequence of images of living objects obtained through microscopy is provided, the apparatus comprising: a processor; and a storage unit configured to store a program which, when executed by the processor, causes the processor to perform acts of: acquiring a first sequence of first images of living objects obtained through microscopy; extracting a second sequence of second images from the first sequence of first images, wherein a number of second images in the second sequence is less than a number of first images in the first sequence; and controlling a display device to display the second sequence of second images.

According to an aspect of the present disclosure, a method for controlling display of a sequence of images of living objects obtained through microscopy is provided, the method comprising: acquiring a first sequence of images of living objects obtained through microscopy; extracting a second sequence of images from the first sequence of images, wherein a number of second images in the second sequence is less than a number of first images in the first sequence; and controlling a display device to display the second sequence of images.

According to an aspect of the present disclosure, a system for controlling display of a sequence of images of living objects obtained through microscopy is provided, the system comprising: an image processing apparatus; and a microscope, wherein the image processing apparatus is configured to perform a method comprising: controlling the microscope to acquire a first sequence of images of living objects, extracting a second sequence of images from the first sequence of images, wherein a number of second images in the second sequence is less than a number of first images in the first sequence, and controlling a display device to display the second sequence of images.

According to an aspect of the present disclosure, a non-transitory, computer-readable storage medium is provided, the storage medium storing a processor-executable program which, when executed by a processor, causes the processor to perform a method for controlling display of a sequence of images of living objects obtained through microscopy, the method comprising: acquiring a first sequence of images of living objects obtained through microscopy; extracting a second sequence of images from the first sequence of images, wherein a number of second images in the second sequence is less than a number of first images in the first sequence; and controlling a display device to display the second sequence of images.

Technical Problem

However, these techniques in the related art are simply directed to recognition of cells. In order to confirm a whole image obtained by imaging over a long time, it would have taken as long time as the time of imaging. Thus, there was still a weak point when an image obtained by imaging over a long time should be observed with good efficiency.

In view of the circumstances as described above, it is desirable to provide an image processing device and an image processing method which makes it possible to observe an image obtained by imaging over a long time, with good efficiency.

Solution To Problem

According to an embodiment of the present disclosure, there is provided an image processing device including a control unit. The control unit is configured to acquire a plurality of images having temporal continuity, the plurality of images being obtained by a temporal observation of living cells by microscopy; analyze feature values of the acquired images; calculate an index indicating an extent of change in the feature values between each temporally consecutive pair of images among the plurality of images, on the basis of a result of the analysis of the feature values; select images in which the index exceeds a predetermined threshold; and display the selected images, onto a display unit, in a temporal sequence.

According to one embodiment, the control unit of the image processing device may be further configured to set at least one ROI (region of interest) (e.g., a portion of an image) to the acquired images; analyze the feature values of the set ROI; and calculate the index for each ROI.

According to one embodiment, the control unit of the image processing device may be configured to select images in which the calculated index with respect to the at least one ROI exceeds the threshold.

According to one embodiment, the control unit of the image processing device may be further configured to receive a user's specification of the ROI via an input unit; and select images in which the calculated index of the user-specified ROI exceeds the threshold.

According to one embodiment, the control unit of the image processing device may be configured to display the ROI of the images in an enlarged manner.

According to one embodiment, the control unit of the image processing device may be configured to set the threshold based on an input received via the input unit.

According to one embodiment, the control unit of the image processing device may be configured to set the threshold based on an amount of the change in the feature values.

According to one embodiment, the control unit of the image processing device may be further configured to adjust the threshold in such a manner that, when the plurality of images is to be reproduced as a video image, the plurality of images is selected depending on a reproduction time being received via the input unit.

According to one embodiment, the feature values for the image processing device may include at least one of luminance, edge, motion vector and density.

According to one embodiment, the control unit of the image processing device may be configured to calculate the index by using amounts of changes in the feature values, normalized amounts of changes in the feature values obtained by normalizing the amounts of changes in the feature values, and a total of the normalized amounts of changes, by the following formula:

(index)=·SIGMA·((amount of change in the feature values)*(normalized amount of change in the feature values)/(total of normalized amounts of changes))

According to another embodiment of the present disclosure, there is provided an image processing method performed by a control unit, which method includes: acquiring a plurality of images having temporal continuity, the plurality of images being obtained by a temporal observation of living cells by microscopy; analyzing feature values of the acquired images; calculating an index indicating an extent of change in the feature values between each temporally consecutive pair of images among the plurality of images, on the basis of a result of the analysis of the feature values; selecting images between which the index exceeds a predetermined threshold, among the plurality of images; and displaying the selected images, onto a display unit, in a temporal sequence.

Advantageous Effects of Invention

As described above, according to the present disclosure, it makes it possible to observe an image obtained by imaging over a long time, with good efficiency. However, this effect is not limitative. For example, any one of the effects described herein may be an effect of an embodiment of the present disclosure.

BRIEF DESCRIPTION OF DRAWINGS

FIG. 7 is a flowchart for describing a flow of processing of specification or detection of ROIs.

FIG. 8 is a figure showing an example of a ROI information table 52a.

DESCRIPTION OF EMBODIMENTS

First Embodiment

Hereinafter, some embodiments of the present disclosure will be described with reference to the drawings. In the following description, first, a concept of how to realize a digest reproduction of a lengthy video image obtained by time-lapse microscopy or the like will be described. Subsequently, an index to be used for creating a digest will be described; and then a configuration of an image processing device according to this embodiment, as well as a flow of processing by the image processing device, will be described.

(Concept of Digest Reproduction)

Figure 1:
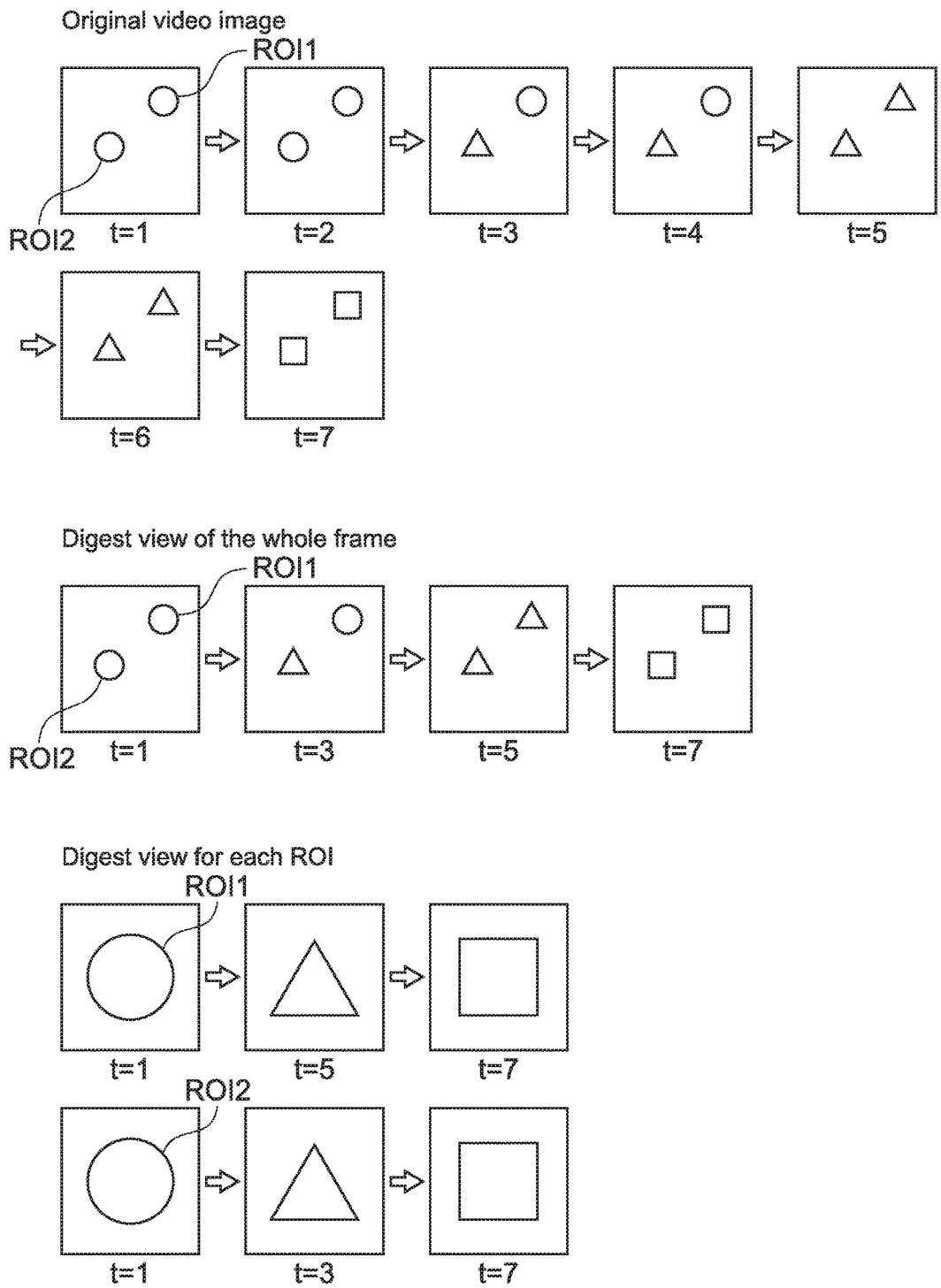
FIG. 1 is a figure for describing a concept of a digest reproduction of a video image which is executed by an image processing device according to an embodiment of the present disclosure.

First, the concept of the digest reproduction of a video image which is executed by an image processing device according to this embodiment will be described. FIG. 1 is a figure for describing the concept of the digest reproduction according to the embodiment.

The upper part of the figure shows an example of an original video image whose digest is to be reproduced. An image at the time t=1 contains images of two circular cells. Herein, a region with the image of the upper-right cell will be referred to as a ROI (Region of Interest) 1; and a region with the image of the lower-left cell will be referred to as a ROI 2.

Now suppose the following case: there was no change in the image at the time t=2; but at the time t=3, the shape of the cell of the ROI2 turned to a triangle-like shape. There was no change in the image at the time t=4; but at the time t=5, the shape of the cell of the ROI1 turned to a triangle-like shape. There was no change in the image at the time t=6; but at the time t=7, the shapes of the both cells turned to square-like shapes.

The central part of the figure shows an example of the digest reproduction which captured the changes in the whole frame (image). That is, the digest is made in such a manner that whenever any one or more of the ROIs contained in the image shows a change, the change is included in the digest. In this example, a digest made up of four images, including: the image of the time t=3 where only the cell of the ROI2 showed a change; the image of the time t=5 where only the cell of the ROI1 showed a change; and the image of the time t=7 where the both cells showed a change, is reproduced.

The bottom part of the figure shows an example of the digest reproduction which captured the changes in each ROI. For example, for the cell of the ROI1, as the changes were seen at only the time t=5 and the time t=7, the digest is made up of three images including these two images. Note that the digest that captured the changes in the ROI1 may be displayed in either way of: displaying the enlarged view of the ROI1 as shown here; or displaying the whole image so that the positional relation with another cell can be easily understood.

The above has described the concept of the digest reproduction of a video image which is executed by the image processing device according to this embodiment.

(Method of Selecting Frames to Use for Digest Reproduction (Outline))

Next, an outline of a method of extracting the frames to be used for the digest, out of the frames that make up the video image, will be described.

First, an index regarding the above-mentioned "change" (change index) is considered. Then, this change index is determined for each of the frames that make up the video image. As a criterion for selecting the frames to be used for the digest, a condition that the change index exceeds a predetermined threshold is employed.

With such a configuration, the number of the frames each having the change index that exceeds the threshold may increase or decrease when the user changes the setting of the threshold. By the increase or decrease of the number of the frames to be used for the digest, it becomes possible to carry out the digest reproduction in various reproduction time lengths.

Furthermore, with the image processing device configured to be capable of capturing a plurality of kinds of "changes", it becomes possible to create the digest in accordance with the changes specified by the user, example of which changes include cell division, migration, and angiogenesis.

Thus, with the image processing device according to the embodiment of the present disclosure, a user (researcher) may specify the type of change and extent of change (threshold) that the user wishes to observe; and can observe only the images where the specified type of change of more than the specified threshold has occurred, as the digest; and therefore it becomes possible to reduce the time for analysis.

The above has described the method of extracting the frames to be used for the digest, out of the frames that make up the video image.

(Kinds of "Changes" as Targets of the Present Disclosure (Examples))

Here, the kinds of the "changes" that the image processing device according to the embodiment of the present disclosure deals with will be described by three examples. However, it should be noted that it is also possible to capture the changes other than the following kinds of changes and carry out the digest reproduction, according to the present disclosure.

(1) Cell Division or the Like, Change in Form and State (Change in Edge and Luminance)

In order to capture the change in the form and the state, phase-contrast images and fluorescence images may be used. The phase-contrast images can be used for determining positions of contoured parts when setting the ROI and when tracking and imaging the cell. It is possible to determine the change index with the use of the number of edges and variance of edges obtained by a measurement of the phase-contrast images.

Further, by using the fluorescence images, it is possible to determine the frame of a starting point and that of an end point of a continuous change. For example, it may determine that the frame where a change in fluorescence has begun is the starting point; and the frame where the decrease in luminance of fluorescence has become the smallest among the frames where the luminance of fluorescence has increased or decreased is the end point. It is possible to determine the change index with the use of a histogram of the luminance that can be obtained by a measurement of the fluorescence images.

In addition, it is also possible to use, in combination, both of the phase-contrast images and the fluorescence images which have been obtained by imaging one biological sample. For example, since the contour of the cells can be clearly imaged in the phase-contrast images, the phase-contrast images can be used in identifying the region with the image of the cell as a ROI. After that, a change in this ROI can be captured by using the fluorescence images.

(2) Migration, Transport, or the Like, Change in Dynamic State (Movement)

Each of the migrating cells is tracked, and a motion vector regarding each cell is calculated by a method of ME (Motion Vector Estimation) or the like. From the total amount of the changes in amounts of movement, it is possible to calculate the change index.

(3) Change in Density that is Typical of Activation of Immune Cells, and Vascularization It is possible to calculate the change index from changes in density of the fluorescent substances appearing in the regions where immune cells are activated or where vascularization is taking place (tumor exists), in the fluorescence images. For example, it is possible to calculate the change index from the total of the luminance in the ROIs.

The above has described the kinds of the "changes" that the image processing device according to the embodiment of the present disclosure deals with; as described by the three examples.

(Change Index and Coefficient for Change Index)

Here, an example of a method for determining the above-mentioned change index will be described. The method for determining the change index explained here includes: first, calculating a coefficient for determining the change index, and then calculating the change index with the use of the calculated coefficient.

First, supposing that four kinds of changes are considered in the calculation, the amounts of changes would be referred to as A, B, C and D. These amounts of changes may each correspond to, for example, a change in luminance, a change in the total number of edges, a change in density, a change in the movement, or the like.

Next, a normalized amount of change is determined. The normalized amount of change can be determined by a formula of: (amount of change)/(total amounts of changes). The normalized amounts of changes corresponding to the amounts of changes A, B, C and D will be referred to as a, b, c and d, respectively.

Then, a total of the normalized amounts of changes n is determined. The total of the normalized amounts of changes n can be obtained by adding up the normalized amounts of changes, by a formula of:

$$n = \text{SIGMA} \cdot (\text{normalized amounts of changes}).$$

Subsequently, a coefficient for calculating the change index is determined. The coefficients corresponding to the amounts of changes A, B, C and D will be referred to as p, q, r and s, respectively; and the coefficients can be determined by formulae of: $p=a/n$, $q=b/n$, $r=c/n$ and $s=d/n$.

However, note that the way to determine the coefficients p, q, r and s is not limited to the method by using the above-mentioned formulae. For example, the coefficients may all be 1; or, some predetermined default values may be used as the coefficients as well.

Finally, the change index is calculated as a total of the values of (coefficient)*(amount of change). In other words, the change index can be obtained by the following formula.

$$(\text{change index}) = pA + qB + rC + sD$$

It should be noted that four kinds of changes have been considered here, but also, more kinds of changes may be taken in consideration in calculating the change index. In such a case, an additional kind of amount of change may be E, the normalized amounts of change may be e, the coefficient may be u; and the change index can be determined by: $u=e/n$, (change index)$=pA+qB+rC+sD+uE$.

The above has described an example of the method for determining the change index.

(Example if GUI of Image Processing Device)

Figure 2:
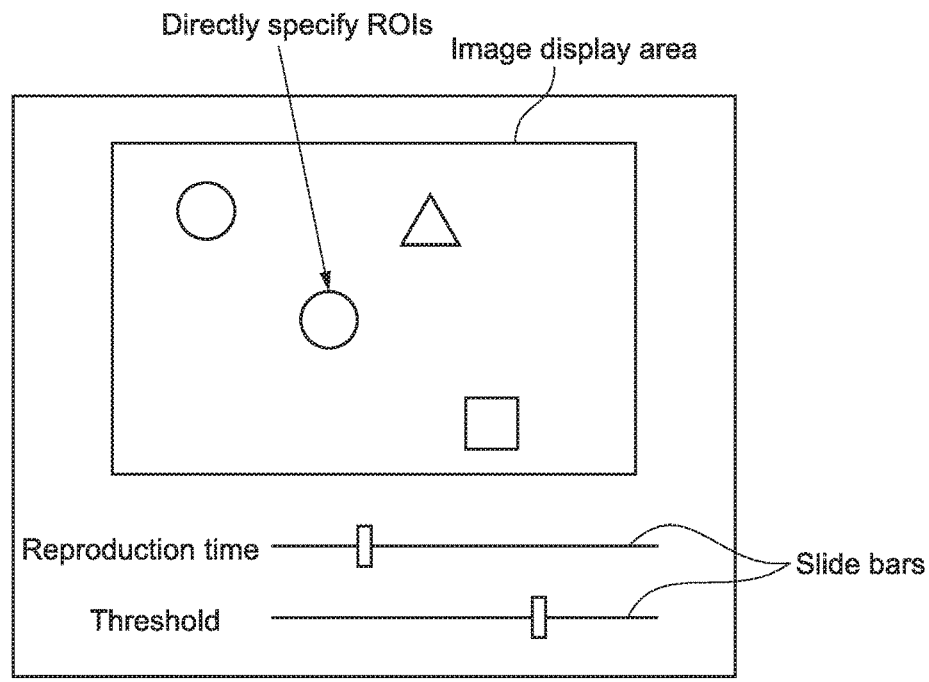
FIG. 2 is a figure showing an example of a GUI used in the image processing device according to the embodiment.
Figure 3:
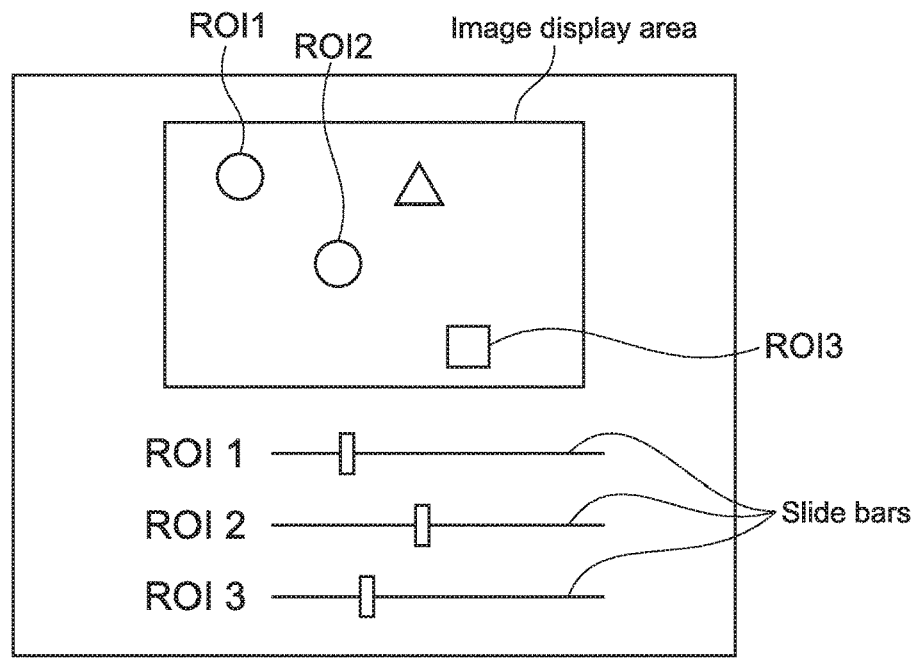
FIG. 3 is a figure showing an example of a GUI used in the image processing device according to the embodiment.

Next, an example of a GUI (Graphical User Interface) used in the image processing device according to this embodiment will be described. FIGS. 2 and 3 show some examples of the GUI used in the image processing device according to the embodiment.

The example shown in FIG. 2 has an image display area where a fluorescence image or bright-field image may be displayed; and has some slide bars under the image display area: one for allowing a user to specify a reproduction time of the digest reproduction, and another for allowing the user to specify the above-mentioned threshold. Note that there is a relation between the reproduction time and the threshold that: a longer reproduction time makes the threshold lower; and a higher threshold makes the length of the reproduction time shorter.

In this example, the user may specify a circular cell, whose image is appearing in the center of the image display area, as a ROI by directly clicking the image or the like. The user may then adjust the slide bar indicating the reproduction time. As a result, with respect to the specified ROI, the threshold may be adjusted so that the length of the digest would be within the specified time, and among the frames that showed some changes, the frames where the change index exceeds the threshold are selected to be reproduced in the digest.

The example shown in FIG. 3 has some slide bars displayed, corresponding to the number of the ROIs that the user has specified out of the image display area. Here, the user has specified three ROIs; so three slide bars are displayed so that the user can specify the thresholds for the respective ROIs to have their frames selected to be reproduced in the digest.

The above has described an example of the GUI used in the image processing device according to this embodiment.

(Configuration of Image Processing Device)

Figure 4:
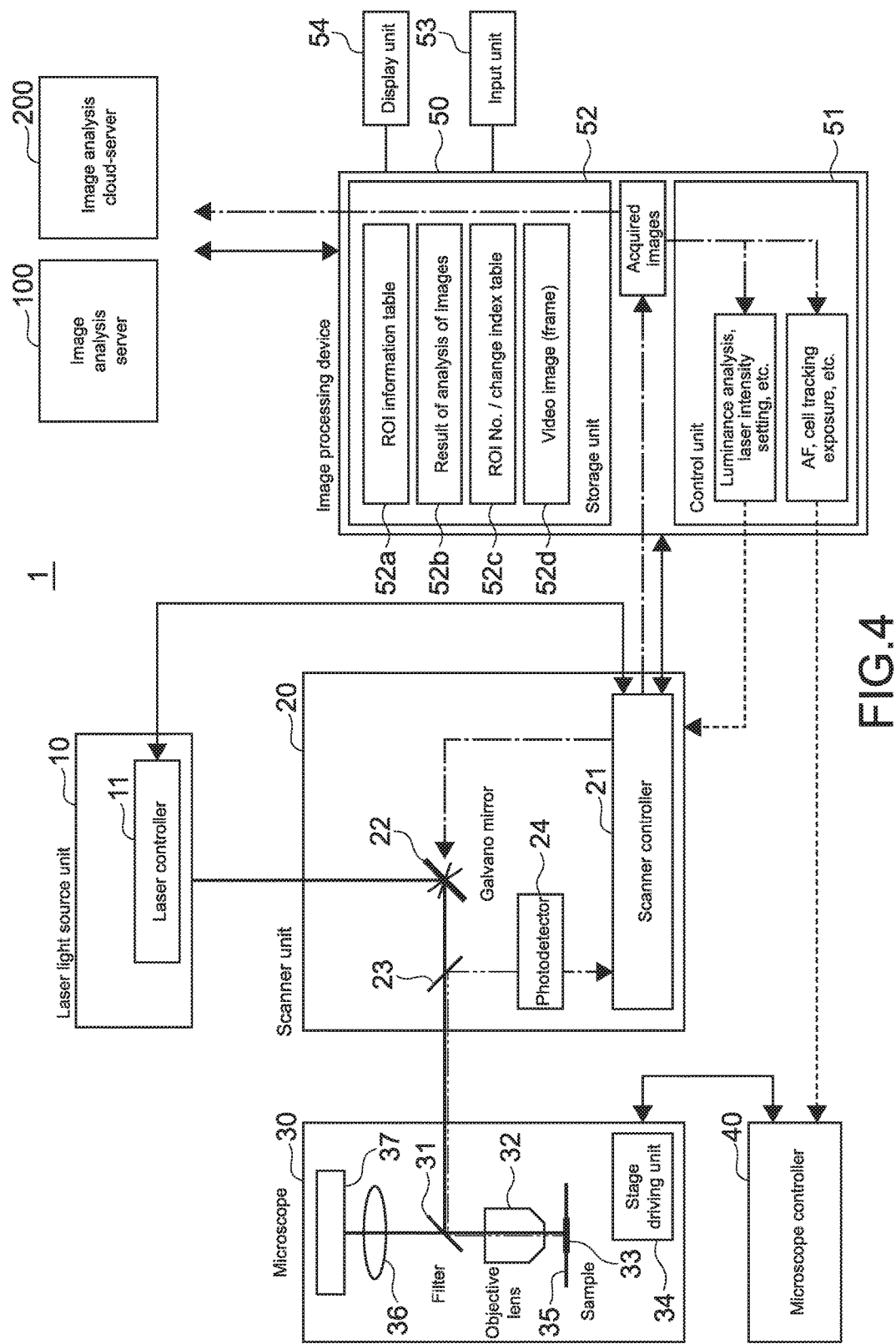
FIG. 4 is a configuration diagram of a microscope system 1 including an image processing device 50 according to the embodiment.

Next, an outline of a configuration of a microscope system including an image processing device according to this embodiment will be described. FIG. 4 is a configuration diagram of a microscope system 1 including an image processing device 50 according to the embodiment.

The microscope system 1 includes a laser light source unit 10, a scanner unit 20, a microscope 30, a microscope controller 40 and the image processing device 50. Note that the processing such as image analysis, which is executed by the image processing device 50, may also be executed by an image analysis server 100 on a local network, or by an image analysis cloud-server 200 on the Internet cloud.

The laser light source unit 10 produces excitation light for causing a sample such as fluorescent-labeled cells to generate fluorescent light. The produced excitation light would be introduced in the scanner unit 20.

The laser light source unit 10 includes a laser controller 11. Intensity and interval of the emission of the excitation light is controlled by the laser controller 11.

The scanner unit 20 includes a scanner controller 21, a galvano mirror 22, a dichroic mirror 23 and a photodetector 24.

The galvano mirror 22 changes the direction of laser light in each of X and Y directions so that a sample being placed on a stage 35 of the microscope 30 would be irradiated with the laser light for excitation introduced from the laser light source unit 10 moving in horizontal directions (X and Y directions) with respect to the sample. The laser light, having its direction arranged by the galvano mirror 22, would be introduced in the microscope 30 after passing through the dichroic mirror 23. The laser light introduced in the microscope 30 would irradiate the sample; and the fluorescent light excited by the irradiation comes back to the scanner unit 20 from the microscope 30.

The dichroic mirror 23 reflects the fluorescent light to the photodetector 24; out of the laser light and the fluorescent light that has come back from the microscope 30.

The photodetector 24 typically includes a PMT (Photomultiplier Tube). The photodetector 24 detects the fluorescent light generated by excitation in the sample being irradiated with the laser light. Note that in a case where a confocal microscope is used, a pinhole may be placed in front of the photodetector 24 on the light path. The position where this pinhole is set is a position conjugate to a focal position of an objective lens which will be described later.

The scanner controller 21 may control the galvano mirror 22, and may control the photodetector 24, in order to scan the sample in X and Y directions. A signal detected by the photodetector 24 would be transmitted to the image processing device 50, as the signal indicating luminance for each position of an XY plane being scanned.

The microscope 30 includes a filter 31, an objective lens 32, a stage 35, a stage driving unit 34, an imaging lens 36, an imaging unit 37 and a temperature sensor 38. Note that the sample to be observed is placed on the stage 35.

The filter 31 guides the laser light introduced from the scanner unit 20 to the objective lens 32. The filter 31 may guide the fluorescent light being generated from the sample due to the laser irradiation, to the scanner unit 20. The filter 31 may guide the light that has irradiated the sample from a bright-field light source (not shown) and has been reflected by or passed through the sample, so that the light is guided to the imaging lens 36.

The objective lens 32 collects the laser light introduced from the scanner unit 20 through the filter 31, to a focal point of the objective lens 32. The objective lens 32 may guide the fluorescent light being generated from the sample, to the scanner unit 20, via the filter 31. The objective lens 32 may guide the light that has irradiated the sample from the bright-field light source, to the imaging lens 36, via the filter 31.

On the stage 35, the sample would be placed. The stage 35 may be moved in X and Y directions which are perpendicular to an optical axis of the objective lens 32, and in Z direction which is the direction along the optical axis of the objective lens 32.

The imaging lens 36 allows the bright-field light which has passed through the objective lens 32 and the filter 31 to form an image onto an imaging element (not shown) of the imaging unit 37.

The imaging unit 37 images a bright-field image that has been formed on the imaging element with the imaging lens 36. The imaged image may be sent to the image processing device 50, and the image may be analyzed.

The microscope controller 40 is configured to move the stage 35 with respect to the stage driving unit 34, based on instructions from the image processing device 50, which instructions may be related to auto focus, cell tracking exposure, and the like.

The image processing device 50 includes a control unit 51, a storage unit 52, an input unit 53 and a display unit 54. The image processing device 50 may typically be made of a PC (Personal Computer).

The control unit 51 may control the entire microscope system 1; synthesize a fluorescence image from the luminance being detected by the photodetector 24 and the corresponding coordinates in the XY plane in which the luminance has been detected; and control an intensity of the laser light by analyzing the synthesized fluorescence image and calculating an optimum laser light intensity. In addition, as described above, the control unit 51 may control the microscope controller 40 to realize the functions of auto focus, cell tracking exposure, and the like of, the microscope 30.

Note that the control unit 51 may be realized by a CPU (Central Processing Unit), which executes programs stored in the storage unit 52. Details of the configuration of the control unit 51 will be described later.

The storage unit 52 may include a hard disk drive and a semiconductor memory. The storage unit 52 may store a set of the above-mentioned programs to be executed by the CPU; fluorescence images obtained from the scanner unit 20; and information such as a ROI information table 52a, a result of analysis of images 52b, a ROI No./change index table 52c and a video image (frame) 52d.

The input unit 53 may include a pointing device such as a mouse and a touch panel; a keyboard; and the like. The input unit 53 is configured to input the user's instruction via the GUI, or the like.

The display unit 54 may include a display device such as a liquid crystal display; and a display control unit for drawing the GUI, images, and the like, onto the display device.

The above has described the outline of the configuration of the microscope system 1 including the image processing device 50 according to this embodiment. Note that although the image processing device 50 has been described here as a part of the microscope system 1, this configuration is not limitative. Alternatively, the image processing device 50 may be made of a PC, or the like, which is independent from the microscope system 1.

(Configuration of Control Unit 51)

Figure 5:
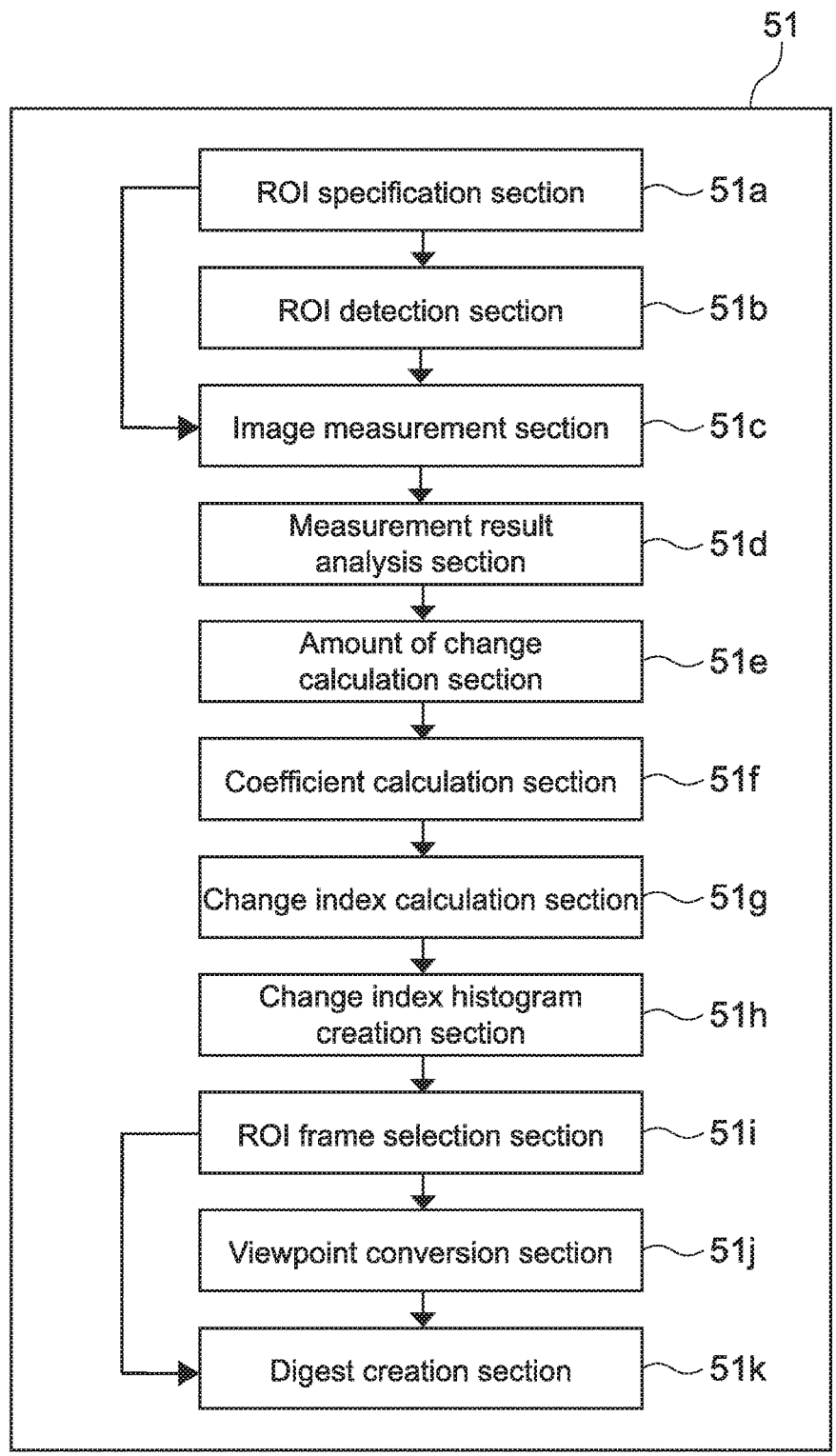
FIG. 5 is a configuration diagram of a control unit 51.

Here, a configuration of the control unit 51 as functional blocks that can be realized by execution of the programs by the CPU will be described. FIG. 5 is a configuration diagram of the control unit 51. Note that the following shows only a part of the functions of the control unit 51, which part is related to the digest reproduction.

The control unit 51 includes a ROI specification section 51a, a ROI detection section 51b, an image measurement section 51c, a measurement result analysis section 51d, an amount of change calculation section 51e, a coefficient calculation section 51f, a change index calculation section 51g, a change index histogram creation section 51h, a ROI frame selection section 51i, a viewpoint conversion section 51j and a digest creation section 51k.

The ROI specification section 51a is configured to display the image that has been captured by microscopy, onto a display screen of the display unit 54; and receive at least one user-specified region in the image as a ROI, the region being specified by the user with the use of the GUI and the input unit 53.

The ROI detection section 51b is configured to detect at least one region to be used as a ROI in the target image, instead of user-specified ROIs, in cases where the user does not specify any desired ROI using the ROI specification section 51a.

The image measurement section 51c is configured to measure luminance, edges, areas, luminance centroids and the like, with respect to a ROI set to the target image. A result of the measurement would be analyzed by the measurement result analysis section 51d.

The measurement result analysis section 51d is configured to analyze the result of the measurement by the image measurement section 51c. For example, the measurement result analysis section 51d may create a histogram of luminance, and calculate a variance of the luminance, based on the luminance measured by the image measurement section 51c. The measurement result analysis section 51d may calculate a total of edges and a variance of the edges, based on the edges measured by the image measurement section 51c. The measurement result analysis section 51d may calculate a density of the luminance, based on the areas and the luminance centroids measured by the image measurement section 51c.

The amount of change calculation section 51e is configured to calculate an amount of change between the result of the analysis by the measurement result analysis section 51d and, the prior result of analysis of images 52b that has been stored in the storage unit 52; in which the change is the change between the frames, or the change per unit time.

The coefficient calculation section 51f is configured to calculate a coefficient for the above-mentioned change index, based on the amount of change calculated by the amount of change calculation section 51e.

The change index calculation section 51g is configured to calculate the change index, based on the amount of change calculated by the amount of change calculation section 51e and the coefficient calculated by the coefficient calculation section 51f.

The change index histogram creation section 51h is configured to create a histogram for selecting frames to include in the digest. The histogram is created from the frames of the original video image whose digest is to be made, and the values of the change indexes held by the respective frames.

The ROI frame selection section 51i is configured to select the frames to be reproduced in the digest for the specified or detected ROI, based on the histogram created by the change index histogram creation section 51h.

The viewpoint conversion section 51j is an optional component for the digest reproduction. The viewpoint conversion section 51j is configured to reconstruct and display the image as an image seen from a viewpoint that has been employed by the user in imaging the biological sample; which viewpoint may be arbitrarily specified by the user and is not limited to the viewpoint directly above the sample. Note that in order to realize this function, the following precondition should be met: some images obtained by imaging an XY plane with a focal point being moved at a plurality of positions in Z direction at each time of the imaging (Z-stack) exist; and three-dimensional images are constructed.

The digest creation section 51k is configured to display the images selected by the ROI frame selection section 51i, onto the display unit 54, in a temporal sequence; and thus reproduce the video image in digest, the video image having been obtained by imaging the biological sample for its temporal observation. Note that other than reproducing the digest as a video image, the digest creation section 51k may also display a process of change in a form of thumbnail images arranged in a temporal sequence, the thumbnail images being thumbnail still images of the images where the changes have occurred. In addition, the digest creation section 51k may extract the images where the changes have occurred; and output the images in a format that can be used for papers and reports.

The above has described the configuration of the control unit 51.

(Outline of Processing Executed by Image Processing Device)

Figure 6:
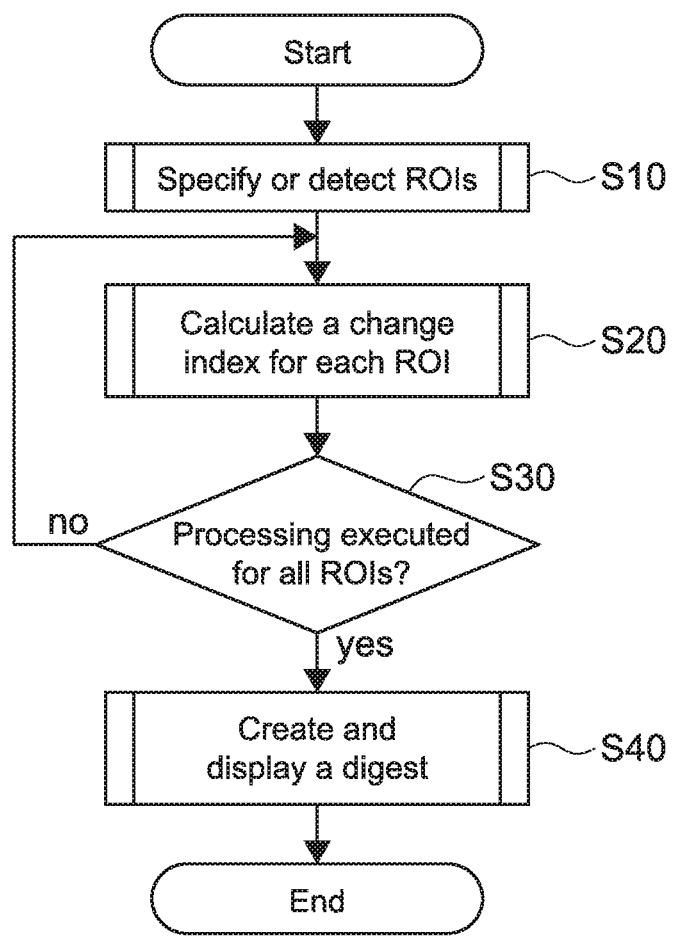
FIG. 6 is a flowchart for describing an outline of a flow of processing executed by the image processing device 50.

Next, an outline of a flow of processing executed by the image processing device 50 will be described. FIG. 6 is a flowchart for describing the outline of the flow of this processing.

First, the control unit 51 specifies the ROIs (or ROI) specified by the user, or detects the ROIs, in the frames to be processed (processing of specification or detection of ROIs) (step S10).

Next, the control unit 51 executes processing of calculation of a change index for each ROI, to the frames to be processed (step S20).

Subsequently, the control unit 51 determines whether or not the calculation of the change index has been executed for all of the ROIs (step S30). If there is a remaining ROI whose change index has not been calculated yet ("no" of step S30), the process returns to the step S20 and continues with the processing of calculation of the change index. In cases where the calculation of the change index has been completed for all of the ROIs ("yes" of step S30), the process goes to the next step S40.

Then, the control unit 51 creates a digest by selecting the frames to use in displaying the digest, among the frames of the original video image, with the use of the change index calculated in the step S20. The control unit 51 displays the created digest (processing of creation and display of a digest) (step S40).

Note that although not shown, it goes without saying that the control unit 51 is configured to determine the change index for every ROI with respect to every frame that makes up the video image; which is not just to determine the change index for every ROI with respect to only one frame of the video image.

The above has described the outline of the flow of the processing executed by the image processing device 50. To put it another way, it can be described that the control unit 51 of the image processing device 50 is configured to: acquire a plurality of images having temporal continuity, the plurality of images being obtained by a temporal observation of living cells by microscopy; analyze feature values of the acquired images; calculate an index indicating an extent of change in the feature values between each temporally consecutive pair of images among the plurality of images, on the basis of a result of the analysis of the feature values; select images in which the index exceeds a predetermined threshold; and display the selected images, on the display unit 54, in a temporal sequence. Hereinafter, a detailed flow of each processing that has been described here will be described.

(Processing of Specification or Detection of ROIS)

Figures 7, 8:
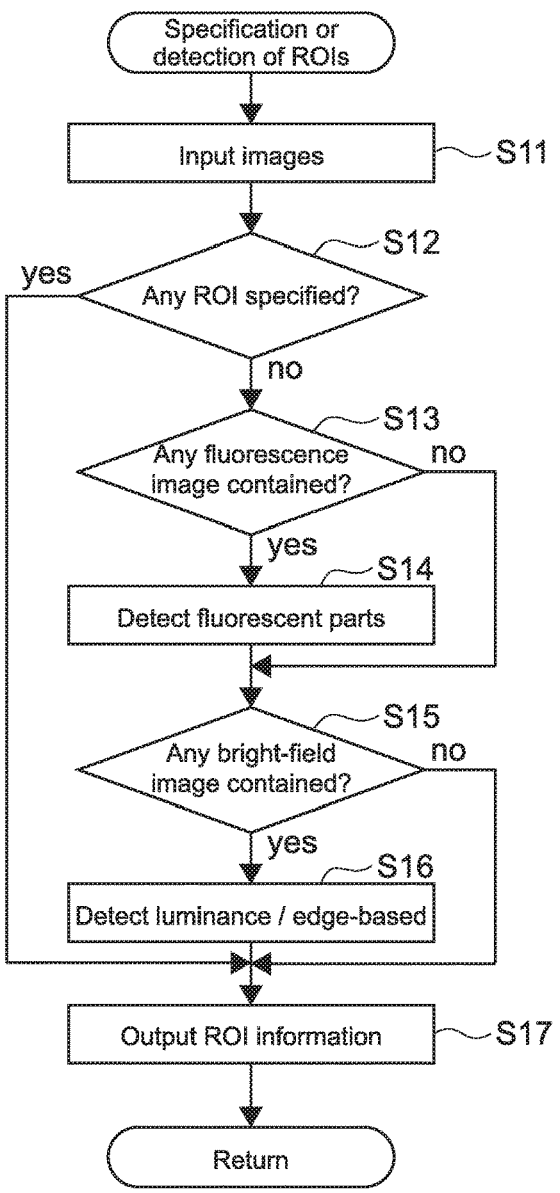

Here, a flow of processing of specification or detection of ROIs by the control unit 51 will be described. FIG. 7 is a flowchart for describing the flow of the processing of specification or detection of the ROIs.

First, the control unit 51 reads an image corresponding to one frame, from the original video image 52d whose digest is to be created, which video image 52d has been stored in the storage unit 52 (step S11). The read image would be displayed onto the image display area of the display unit 54.

Then, the ROI specification section 51a may receive specification of ROIs from a user. The ROI specification section 51a determines whether or not any ROI has been specified (step S12). If there is a ROI specified by the user ("yes" of step S12), the process goes to step S17. If there is no specification of ROIs by the user ("no" of step S12), the process goes to step S13.

In cases where there has been no specification of ROIs by the user in the step S12, the control unit 51 next determines whether or not the image to be processed is a fluorescence image (step S13).

If the image is a fluorescence image ("yes" of step S13), the process goes to step S14. If the image is not a fluorescence image ("no" of step S13), the process goes to step S15.

If it has been determined in the step S13 that the image is a fluorescence image, then the ROI detection section 51b detects the parts having high luminance (fluorescent parts) in the image, and sets the detected fluorescent parts as the ROIs (step S14).

If it has been determined in the step S13 that the image is not a fluorescence image, or, after the processing of the step S14, the control unit 51 next determines whether or not the image to be processed is a bright-field image (step S15). If the image is a bright-field image ("yes" of step S15), the process goes to step S16. If the image is not a bright-field image ("no" of step S15), the process goes to step S17.

If it has been determined in the step S15 that the image is a bright-field image, then the ROI detection section 51b detects the parts having high luminance, or edge parts, in the image, and sets the detected parts as the ROIs (step S16).

Finally, the control unit 51 allows information of the specified or detected ROIs (ROI information) to be stored in the ROI information table 52a (step S17).

The above has described the flow of the processing of specification or detection of the ROIs.

(ROI Information Table)

Next, an example of the ROI information table 52a will be described. FIG. 8 shows an example of the ROI information table 52a.

A row in this table contains ROI No. for uniquely identifying each specified or detected ROI; center coordinate of the ROI; size of the ROI; and frame No. indicating the frame where the ROI is contained.

Note that although the size of the ROI here is represented by its width (W) and height (H), the shape of the ROI is not limited to a square shape, but may be in any shape, and may also be spot-like.

The above has described an example of the ROI information table 52a.

(Processing of Calculation of Change Index for each ROI)

Figures 9, 10:
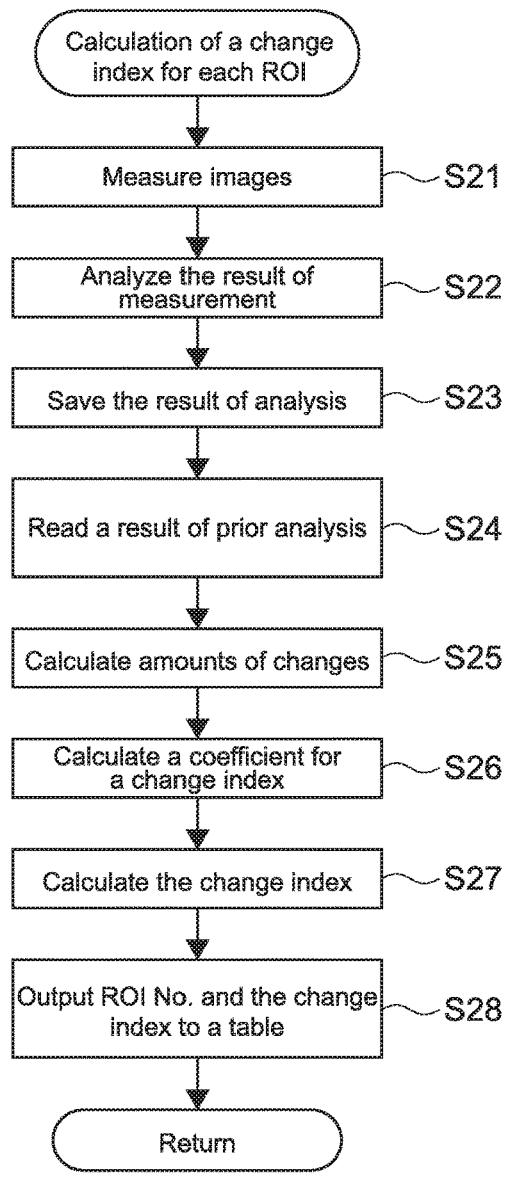
FIG. 9 is a flowchart for describing a flow of processing of calculation of a change index for each ROI.
FIG. 10 is a figure showing an example of a ROI No./change index table 52c.

Next, a flow of processing of calculation of a change index for each ROI, by the control unit 51, will be described. FIG. 9 is a flowchart for describing the flow of the processing of calculation of the change index for each ROI.

First, the image measurement section 51c performs a measurement with respect to a region within the ROI to be processed, on the image to be processed (step S21). This measurement may include: a measurement of luminance; a measurement of edges; a measurement of areas of the parts having high luminance; and a measurement of luminance centroids.

Subsequently, the measurement result analysis section 51d analyzes the result of the measurement by the image measurement section 51c (step S22). In cases where the luminance has been measured in the previous step, the measurement result analysis section 51d may create a histogram of the luminance, and may calculate a variance of the luminance. In cases where the edges have been measured in the previous step, the measurement result analysis section 51d may calculate a total of the edges, and may calculate a variance of the edges. In cases where the areas and the luminance centroids have been measured in the previous step, the measurement result analysis section 51d may calculate a density of the parts having high luminance.

Then, the measurement result analysis section 51d saves the result of the analysis made in the previous step, to the storage unit 52 (step S23).

Next, the amount of change calculation section 51e reads the prior (as previous frame in the video image) result of analysis 52b, from the storage unit 52 (step S24).

Subsequently, the amount of change calculation section 51e calculates amounts of changes based on the prior result of analysis 52b read in the previous step and the result of the analysis made in the step S22 (step S25). Examples of the amounts of changes include those of a change in luminance; a change in edges; a change in density; and a change in the movement. The amounts of changes may be calculated by finding the difference between two results of analyses.

Next, the coefficient calculation section 51f calculates a coefficient for determining a change index, based on the amounts of changes calculated in the previous step (step S26). A method for the calculation is as described above.

Then, the change index calculation section 51g calculates the change index with respect to the ROI to be processed (step S27). A method for the calculation is as described above.

Finally, the change index calculation section 51g writes and saves the ROI No. of the processed ROI and the calculated change index for the ROI, to the ROI No./change index table 52c in the storage unit 52 (step S28).

The above has described the flow of the processing of calculation of the change index for each ROI.

(ROI No./Change Index Table)

Next, an example of the ROI No./change index table 52c will be described. FIG. 10 shows an example of the ROI No./change index table 52c.

A row in this table contains ROI No. for uniquely identifying each specified or detected ROI; and a value of the change index for the corresponding ROI.

Further, the frame No. may be recorded in addition to the ROI No. and the value of the change index.

The above has described an example of the ROI No./change index table 52c.

(Processing of Creation and Display of Digest)

Figure 11:
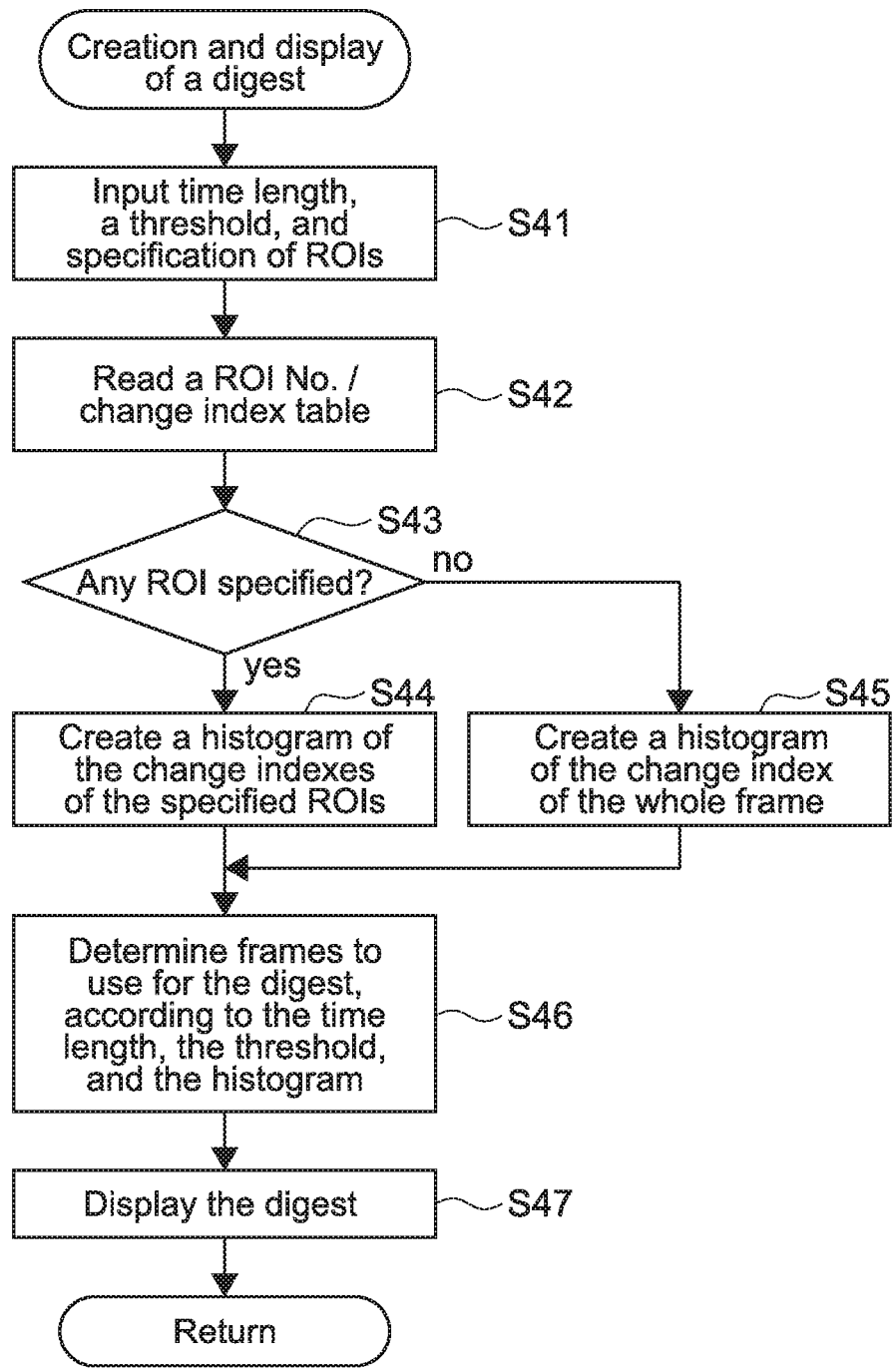
FIG. 11 is a flowchart for describing a flow of processing of creation and display of a digest.

Next, a flow of processing of creation and display of a digest, by the control unit 51, will be described. FIG. 11 is a flowchart for describing the flow of the processing of creation and display of the digest.

First, the control unit 51 acquires a reproduction time length, a threshold on which a reproduction time depends, and information related to specification of the ROIs to be reproduced in digest (step S41).

Next, the control unit 51 reads ROI No. and information of the change index for the corresponding ROI, from the ROI No./change index table 52c in the storage unit 52 (step S42).

Subsequently, the change index histogram creation section 51h determines whether or not the information acquired in the step S41 includes information about specification of the ROIs by the user (step S43).

If one or more ROIs to be reproduced in digest have been specified by the user ("yes" of step S43), the change index histogram creation section 51h next creates a histogram of the change indexes of the specified ROIs (step S44). An example of the histogram of the change indexes will be described later.

If there is no specification of ROIs to be reproduced in digest, by the user ("no" of step S43), the change index histogram creation section 51h next creates a histogram of the change index of the whole frame (step S45). In this case, the histogram may be made by using a highest value among the change indexes held by the ROIs contained in one frame (OR operation among a plurality of ROIs is executed).

Then, the ROI frame selection section 51i selects the frames to use for the digest, based on the histogram of the change indexes created in the previous step and, the reproduction time length and the threshold acquired in the step S41, out of the frames that make up the original video image (step S46). Note that in cases where there has been the specification of ROIs by the user, this step may also include processing of extracting only the image of the ROI that has been specified from the frame being selected.

Finally, the digest creation section 51k reproduces the digest with the use of the frames and the ROIs that have been selected in the previous step (step S47).

The above has described the flow of the processing of creation and display of the digest. Note that although the digest according to the above-described configuration has been made by focusing on the amounts of changes and picking up the frames with relatively high amounts of changes, this configuration is not limitative. For example, a possible configuration may include: a configuration to make a digest by selecting all of the frames where the luminance of a ROI has exceeded a threshold.

(Histogram of Histogram of Change Indexes)

Figure 12:
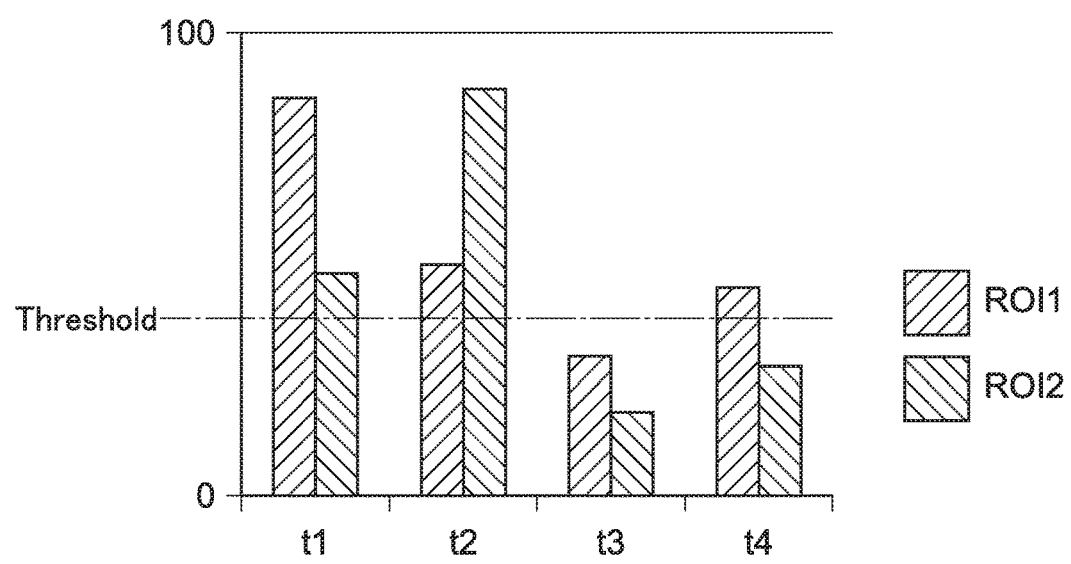
FIG. 12 is an example of a histogram of the change indexes.

Next, an example of the histogram of the change indexes will be described. FIG. 12 is an example of the histogram of the change indexes.

In the graph of this example, time corresponding to each frame making up the video image is taken along the abscissa, and the value of the change index is taken along the ordinate. The value of the change index for each ROI at each time is plotted. In addition, a level of the value indicating the threshold is shown in the ordinate.

In cases where the graph and the threshold value shown in this example are to be used, the values of the change indexes regarding the ROI1 at the times t=1, 2 and 4 are higher than the threshold. Accordingly, regarding the ROI1, the digest using three frames in total, using the frames of the times t=1, 2 and 4, would be reproduced.

On the other hand, the values of the change indexes regarding the ROI2 at the times t=1 and 2 are higher than the threshold. Accordingly, regarding the ROI2, the digest using two frames in total, using the frames of the t=1 and 2, would be reproduced.

The above has described an example of the histogram of the change indexes.

(Method of Setting ROI)

Here, a method of setting a ROI in the image, in cases where the cells or the like observed by the user are moving with time, will be described. Examples of the methods of setting the ROI may include the following two methods.

First method is a method including grasping a range of the movement of the cells with respect to all of the frames that have been selected for the digest, in setting the ROI so as to enclose the cells, or the like, that the user wishes to observe. The position and the range of the ROI may be determined to have a size which contains the range of the movement. The position and the range of the ROI, once determined, may be fixed and unchangeable with respect to all of the frames that have been selected.

Second method is a method including tracking the cells that the user wishes to observe, in each image making up a frame; and setting a tracking box as the ROI. The position and the range of the ROI may vary from one frame to another.

The image processing device 50 may also use the first method and the second one depending on the situation. For example, if the user wishes to view the video image imaged by a temporal observation immediately without waiting for the processing with respect to all of the frames, the second method may be desirable because it may be performed without analyzing all of the frames that have been selected.

Further, it is also possible to set two kinds of ROIs by using both the first and the second methods; to observe the movement of the cells or the like with the use of the ROI set by the first method, and observe details of the inner parts of the cells or the like with the use of the ROI set by the second method.

The above has described some methods of setting the ROI in the image, in cases where the cells or the like observed by the user are moving with time.

In the above, the first embodiment has been described.

Variation Example 1

Automatic Selection of Frames Making Up Digest

According to the configuration of the image processing device 50 according to the first embodiment, the threshold for specifying the frames making up the digest has been specified by the user. On the other hand, in this variation example, an image processing device 50a is configured to automatically set the threshold for selecting the frames making up the digest. The digest may be created without an input of the threshold by the user.

Incidentally, the method of automatically setting the ROI may be one using the above-mentioned amounts of changes and setting an average value of the amounts of changes as the threshold. Alternatively, differential values in the amounts of changes may be calculated, and an average value of the calculated differential values may be the threshold.

The above has described a variation example in which the image processing device 50a automatically sets the threshold for selecting the frames making up the digest, to create the digest without an input of the threshold by the user.

Variation Example 2

Calculation of Change Index when Creating Digest

According to the first embodiment, in the processing of calculation of the change index for each ROI, the change index has been calculated and stored in the ROI No./change index table 52c. In the processing of creation and display of the digest, the digest has been created by reading each change index for the corresponding ROI which has been stored.

On the other hand, in this variation example, the change index is not calculated in the processing of calculation of the change index for each ROI; and, ROI No. and information related to the amounts of changes in the corresponding ROI may be stored in a table. Further, in the processing of creation and display of the digest, the change indexes are calculated by reading the stored ROI No. and the information related to the amounts of changes in the corresponding ROI; and the digest may be created with the use of the calculated change indexes.

The parts of the processing according to the configuration of this variation example which are different from those of the first embodiment are: calculation of the change index for each ROI; and creation and display of the digest. In the following, only these different parts will be described.

(Processing of Calculation of Change Index for each ROI)

Figures 13, 14:
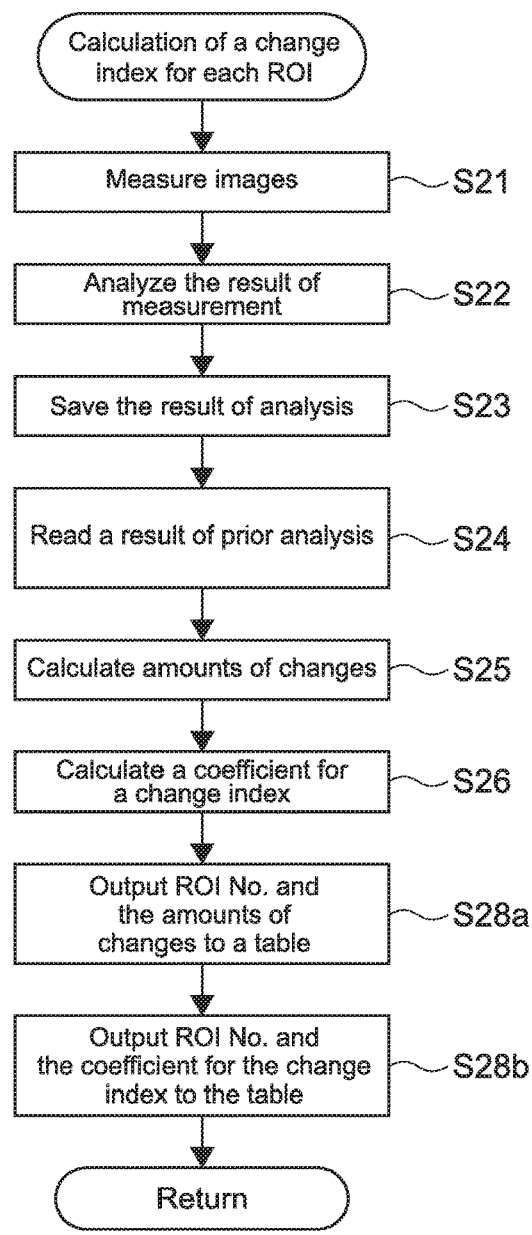
FIG. 13 is a flowchart for describing a flow of processing of calculation of a change index for each ROI.
FIG. 14 is an example of a table which stores ROI No. of each ROI to be processed and amounts of changes in the corresponding ROI.

A flow of processing of calculation of the change index for each ROI, by the control unit 51', will be described. FIG. 13 is a flowchart for describing the flow of the processing of calculation of the change index for each ROI. Note that the processing from the step S21 to step S26 is the same as in the first embodiment, so the description thereof will be omitted, and the part from the next step S28a will be described.

In the next step, the amount of change calculation section 51e allows the ROI No., which ROI No. represents the ROI to be processed, and the amounts of changes in the corresponding ROI, to be stored in a table in the storage unit 52 (step S28a).

Then, the coefficient calculation section 51f allows the coefficient for determining the change index, which coefficient has been calculated in the step S26, to be stored with ROI No. in the table in the storage unit 52 (step S28b).

The above is a flow of processing of calculation of the change index for each ROI, regarding this variation example.

(Example of Table of ROI No. and Amounts of Changes)

Next, an example of the table mentioned in the above will be described. The table stores ROI No. of each ROI to be processed, and amounts of changes in the corresponding ROI. FIG. 14 is an example of the table which stores ROI No. of each ROI to be processed and the amounts of changes in the corresponding ROI.

In this example, a row in this table contains ROI No. for uniquely identifying each ROI; and amounts of changes in the corresponding ROI, classified according to the kinds of changes.

The above has described an example of the table which stores ROI No. of each ROI to be processed and the amounts of changes in the corresponding ROI.

(Processing of Creation and Display of Digest)

Figure 15:
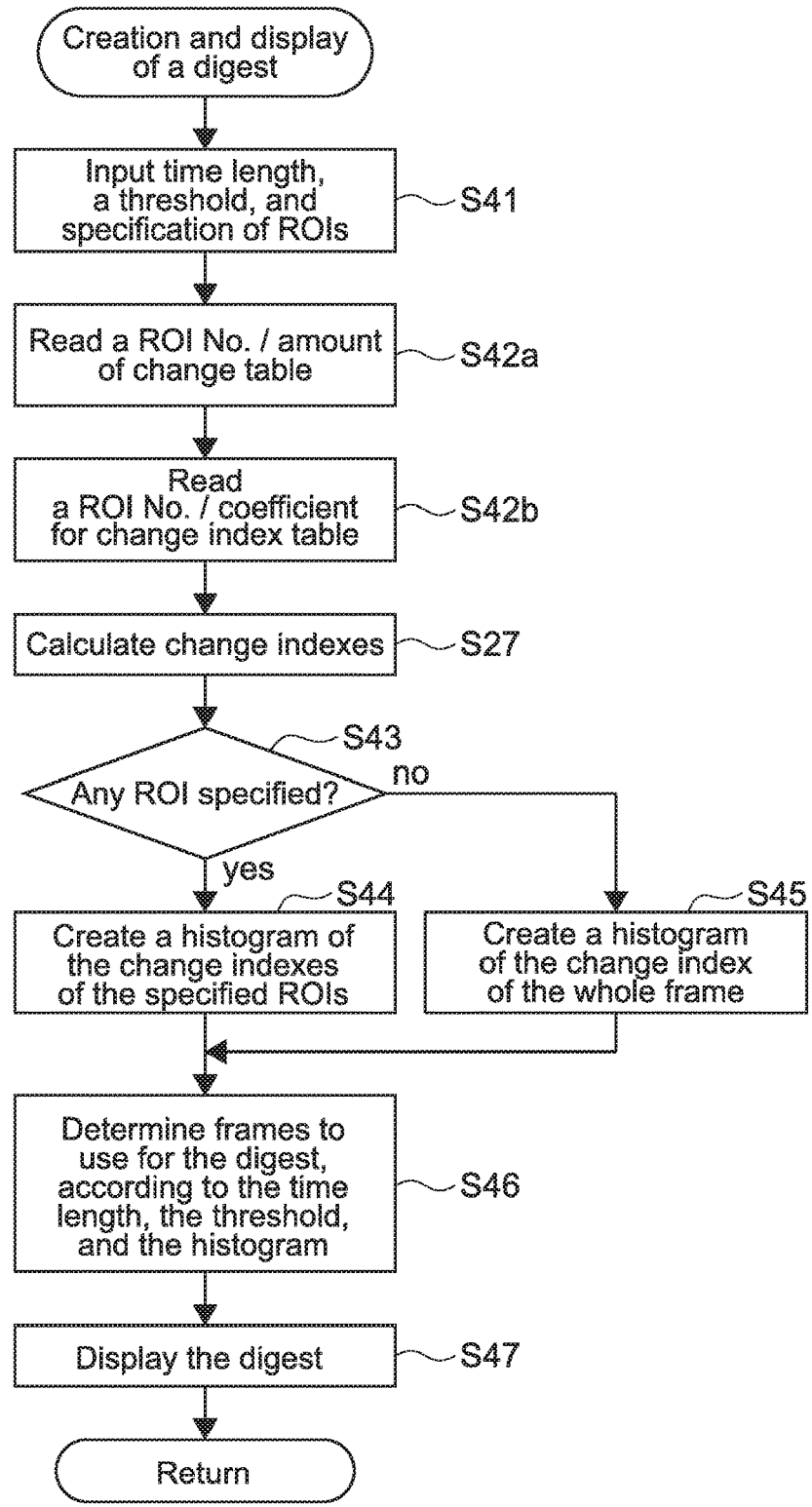
FIG. 15 is a flowchart for describing a flow of processing of creation and display of a digest.

Next, a flow of processing of creation and display of the digest, by the control unit 51', will be described. FIG. 15 is a flowchart for describing the flow of the processing of creation and display of the digest.

First, the control unit 51' acquires a reproduction time length, a threshold on which a reproduction time depends, and information related to specification of the ROIs to be reproduced in digest (step S41).

Next, the control unit 51' reads ROI No. and information of the amounts of changes for the corresponding ROI, from the table of ROI No. and the amounts of changes, which table is in the storage unit 52 (step S42a).

Subsequently, the control unit 51' reads ROI No. and the coefficient for determining the change index for the corresponding ROI, from the table of ROI No. and the coefficient for the change index, which table is in the storage unit 52 (step S42b).

Then, the change index calculation section 51g calculates the change index with respect to the ROI to be processed (step S27). The method for the calculation is the same as described above.

Since the subsequent processing from the step S43 to step S47 is the same as in the first embodiment, the description thereof is omitted.

The above has described a flow of processing of creation and display of the digest, regarding this variation example.

In the above, a variation example in which, the change indexes are calculated in the processing of creation and display of the digest, has been described.

(Supplementary Note)

In addition, the present disclosure is not limited to the embodiments described above and can be modified in various ways without departing from the gist of the present disclosure, as a matter of course.

(Other Configurations of the Present Disclosure)

The present disclosure may also have the following configurations.

(1) An image processing device including:
a control unit configured to
acquire a plurality of images having temporal continuity, the plurality of images being obtained by a temporal observation of living cells by microscopy,
analyze feature values of the acquired images,
calculate an index indicating an extent of change in the feature values between each temporally consecutive pair of images among the plurality of images, on the basis of a result of the analysis of the feature values,
select images in which the index exceeds a predetermined threshold, and
display the selected images, onto a display unit, in a temporal sequence.

(2) The image processing device according to (1), in which
the control unit is further configured to
set at least one ROI to the acquired images,
analyze the feature values of the set ROI, and
calculate the index for each ROI.

(3) The image processing device according to (2), in which
the control unit is configured to select images in which the calculated index with respect to the at least one ROI exceeds the threshold.

(4) The image processing device according to (2), in which
the control unit is further configured to
receive a user's specification of the ROI via an input unit, and
select images in which the calculated index of the user-specified ROI exceeds the threshold.

(5) The image processing device according to any one of (2) to (4), in which the control unit is configured to display the ROI of the images in an enlarged manner.

(6) The image processing device according to any one of (1) to (5), in which
the control unit is configured to set the threshold based on an input received via the input unit.

(7) The image processing device according to any one of (1) to (5), in which
the control unit is configured to set the threshold based on an amount of the change in the feature values.

(8) The image processing device according to any one of (1) to (7), in which
the control unit is further configured to adjust the threshold in such a manner that, when the plurality of images is to be reproduced as a video image, the plurality of images is selected depending on a reproduction time being received via the input unit.

(9) The image processing device according to any one of (1) to (8), in which
the feature values include at least one of luminance, edge, motion vector and density.

(10) The image processing device according to any one of (1) to (9), in which
the control unit is configured to calculate the index
by using
amounts of changes in the feature values,
normalized amounts of changes in the feature values obtained by normalizing the amounts of changes in the feature values, and
a total of the normalized amounts of changes,
by the following formula:

(index)=·SIGMA·((amount of change in the feature values)*(normalized amount of change in the feature values)/(total of normalized amounts of changes))

(11) An image processing method performed by a control unit, the method including:
acquiring a plurality of images having temporal continuity, the plurality of images being obtained by a temporal observation of living cells by microscopy;
analyzing feature values of the acquired images;
calculating an index indicating an extent of change in the feature values between each temporally consecutive pair of images among the plurality of images, on the basis of a result of the analysis of the feature values; selecting images between which the index exceeds a predetermined threshold, among the plurality of images; and
displaying the selected images, onto a display unit, in a temporal sequence.

(A1) An apparatus for controlling display of a sequence of images of living objects obtained through microscopy, comprising: a processor; and a storage unit configured to store a program which, when executed by the processor, causes the processor to perform acts of: acquiring a first sequence of first images of living objects obtained through microscopy; extracting a second sequence of second images from the first sequence of first images, wherein a number of second images in the second sequence is less than a number of first images in the first sequence; and controlling a display device to display the second sequence of second images.

(A2) The apparatus of (A1), wherein extracting the second sequence of second images comprises selecting entire images from the first sequence of first images, and adding the selected entire images to the second sequence as second images.

(A3) The apparatus of (A1), wherein extracting the second sequence of images comprises selecting portions of a plurality of the first images, and adding the selected portions to the second sequence as second images.

(A4) The apparatus of (A3), wherein controlling the display device to display the second sequence of second images comprises enlarging the selected image portions.

(A5) The apparatus of any of (A3) to (A4), wherein the selected portions of the plurality of the first images consist of portions in which a first of the living objects is imaged.

(A6) The apparatus of any of (A3) to (A5), wherein the selected portions of the plurality of the first images correspond to two or more different areas in the plurality of the first images.

(A7) The apparatus of any of (A3) to (A5), wherein the selected portions of the plurality of the first images correspond to a same area in the plurality of the first images.

(A8) The apparatus of any of (A1) to (A7), wherein the program further causes the processor to perform acts of: extracting a third sequence of third images from the first sequence of first images, and controlling the display device to display the third sequence of third images, wherein a number of third images in the third sequence is less than the number of first images in the first sequence.

(A9) The apparatus of (A8), wherein the second sequence of second images consists of images in which a first of the living objects is imaged, and wherein the third sequence of third images consists of images in which a second of the living objects is imaged.

(A10) The apparatus of any of (A1) to (A9), further comprising changing a viewpoint from which contents of the second images are displayed.

(A11) The apparatus of any of (A1) to (A10), wherein the program causes the processor to perform an act of controlling the display device to display a user interface, wherein the user interface includes one or more areas for displaying the second sequence of images, and wherein the user interface further includes one or more areas for receiving user input specifying one or more characteristics of the second sequence of second images.

(A12) The apparatus of (A11), wherein the one or more areas for receiving user input include an area for receiving user input relating to a length of the second sequence of second images.

(A13) The apparatus of any of (A11) to (A12), wherein the one or more areas for receiving user input include an area for receiving using input specifying a portion of an image in the first sequence of first images.

(A14) The apparatus of any of (A11) to (A13), wherein: the one or more areas for receiving user input include an area for receiving user input relating to a threshold value of a parameter, and extracting a second sequence of second images from the first sequence of first images comprises selecting an image from the first sequence of first images and adding the selected image to the second sequence as a second image in response to determining that a value of the parameter associated with the selected image exceeds the threshold value of the parameter.

(A15) The apparatus of (A14), wherein the parameter comprises a luminance of at least a portion of an image, a centroid of a luminance of at least a portion of an image, a density of a luminance of at least a portion of an image, a number of edges in at least a portion of an image, a variance of edges in at least a portion of an image, a motion vector of a living object imaged in an image, and/or a movement of a living object imaged in an image.

(A16) The apparatus of any of (A1) to (A15), wherein the first images comprise phase-contrast images, fluorescence images, and/or bright-field images.

(A17) The apparatus of any (A3), wherein each of the selected image portions comprises a region of interest.

(A18) A method for controlling display of a sequence of images of living objects obtained through microscopy, comprising: acquiring a first sequence of images of living objects obtained through microscopy; extracting a second sequence of images from the first sequence of images, wherein a number of second images in the second sequence is less than a number of first images in the first sequence; and controlling a display device to display the second sequence of images.

(A19) A system for controlling display of a sequence of images of living objects obtained through microscopy, comprising: an image processing apparatus; and a microscope, wherein the image processing apparatus is configured to perform a method comprising: controlling the microscope to acquire a first sequence of images of living objects, extracting a second sequence of images from the first sequence of images, wherein a number of second images in the second sequence is less than a number of first images in the first sequence, and controlling a display device to display the second sequence of images.

(A20) The system of (A19), further comprising the display device.

(A21) A non-transitory, computer-readable storage medium storing a processor-executable program which, when executed by a processor, causes the processor to perform a method for controlling display of a sequence of images of living objects obtained through microscopy, the method comprising: acquiring a first sequence of images of living objects obtained through microscopy; extracting a second sequence of images from the first sequence of images, wherein a number of second images in the second sequence is less than a number of first images in the first sequence; and controlling a display device to display the second sequence of images.

Various aspects of the techniques described in the present disclosure may be embodied as at least one computer-readable storage medium (i.e., at least one tangible, non-transitory, computer-readable medium) encoded with one or more programs that, when executed on one or more processors, implement the various embodiments of the above-described techniques. Examples of a computer-readable storage medium may include, without limitation, a computer memory, one or more floppy discs, compact discs, DVDs, optical discs, magnetic tapes, flash memories, circuit configurations in Field Programmable Gate Arrays or other semiconductor devices, etc. A computer-readable medium may be transportable, such that the program or programs stored thereon may be loaded onto any computer resource to implement various aspects of the techniques described in the present disclosure.

The term "program" is used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform the techniques described herein need not reside on a single computer or processor, but may be distributed in a modular fashion among different computers or processors to implement various aspects of the techniques described in the present disclosure.

The present application contains subject matter related to that disclosed in Japanese Priority Patent Application JP 2013-245891 filed in the Japan Patent Office on Nov. 28, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 microscope system
10 laser light source unit
11 laser controller
20 scanner unit
21 scanner controller
22 galvano mirror
23 dichroic mirror
24 photodetector
30 microscope
31 filter
32 objective lens
33 sample
34 stage driving unit
35 stage
36 imaging lens
37 imaging unit
40 microscope controller
50 image processing device
51 control unit
52 storage unit
52a ROI information table
52b result of analysis of images
52c ROI No./change index table
52d video image (frame)
53 input unit
54 display unit

The invention claimed is:

1. An apparatus, comprising:
at least one processor; and
a storage unit configured to store executable instructions for the at least one processor,
wherein the at least one processor is configured to:
control microscopy of a plurality of living objects;
acquire a first sequence of a plurality of first images of the plurality of living objects, based on the microscopy of the plurality of living objects,
wherein each of the plurality of first images includes a first region of interest and a second region of interest;
determine at least one first image from the plurality of first images is a bright-field image;
determine edge parts in the at least one first image based on the determination that the at least one first image is the bright-field image;
set the determined edge parts as the first region of interest;
select the first region of interest from each of the plurality of first images;
acquire a reproduction time of a plurality of second images based on a first user input;
determine, in a second sequence, the plurality of second images from the plurality of first images based on the selection of the first region of interest and based on the acquired reproduction time,
wherein a first number of images in the plurality of first images is greater than a second number of images in the plurality of second images; and
control a display device to display the plurality of second images in the second sequence.

2. The apparatus of claim 1, wherein the at least one processor is further configured to control the display device to enlarge display of the first region of interest in the displayed plurality of second images.

3. The apparatus of claim 1, wherein the first region of interest corresponds to a first living object of the plurality of living objects.

4. The apparatus of claim 1, wherein a second image of the plurality of second images and a third image of the plurality of second images correspond to different areas in the plurality of first images.

5. The apparatus of claim 1, wherein a second image of the plurality of second images and a third image of the plurality of second images correspond to a same area in the plurality of first images.

6. The apparatus of claim 1, wherein the at least one processor is further configured to:
select the second region of interest from each of the plurality of first images;
determine a plurality of third images in a third sequence based on the selection of the second region of interest from each of the plurality of first images; and
control the display device to display the plurality of third images in the third sequence, wherein a third number of images in the plurality of third images is less than the first number of images in the plurality of first images.

7. The apparatus of claim 6,
wherein the first region of interest corresponds to a first living object of the plurality of living objects, and
wherein the second region of interest corresponds to a second living object of the plurality of living objects.

8. The apparatus of claim 1, wherein the at least one processor is further configured to control the display device to change a viewpoint of the displayed plurality of second images.

9. The apparatus of claim 1, wherein the at least one processor is further configured to:
control the display device to display a user interface;
control the display device to display the plurality of second images in the second sequence in a first area of the displayed user interface;
control the display device to display a user input section in a second area of the displayed user interface; and
receive the first user input on the user input section, wherein the first user input corresponds to at least one characteristic of the plurality of second images.

10. The apparatus of claim 9, wherein the at least one characteristic corresponds to a length of the second sequence of the plurality of second images.

11. The apparatus of claim 9, wherein the at least one processor is further configured to:
receive a second user input from the displayed user interface; and
select the first region of interest in the plurality of first images, based on the received second user input.

12. The apparatus of claim 9, wherein the at least one processor is further configured to:
receive a third user input from the displayed user interface, wherein the third user input corresponds to a threshold value of a parameter associated with the plurality of first images; and
determine the plurality of second images from the plurality of first images based on the received third user input.

13. The apparatus of claim 12, wherein the parameter comprises at least one of a luminance of the selected first region of interest, a centroid of the luminance of the selected first region of interest, a density of the luminance of the selected first region of interest, a number of edges in the selected first region of interest, a variance of the edges in the selected first region of interest, a motion vector corresponding to at least one living object of the plurality of living objects, or a movement corresponding to the at least one living object.

14. The apparatus of claim 1, wherein the plurality of first images comprises at least one of a phase-contrast image or a fluorescence image.

15. The apparatus of claim 1, wherein the at least one processor is further configured to:
adjust a threshold value of a parameter associated with the plurality of first images, based on the acquired reproduction time, wherein the threshold value is inversely proportional to the reproduction time; and
determine, in the second sequence, the plurality of second images from the plurality of first images based on the adjusted threshold value of the parameter.

16. A method, comprising:
controlling microscopy of a plurality of living objects;
acquiring a first sequence of a plurality of first images of the plurality of living objects, based on the microscopy of the plurality of living objects,
wherein each of the plurality of first images includes a first region of interest and a second region of interest;
determining at least one image from the plurality of first images is a bright-field image;
determining edge parts in the at least one image based on the determination that the at least one image is the bright-field image;
setting the determined edge parts as the first region of interest;
selecting the first region of interest from each of the plurality of first images;
acquiring a reproduction time of a plurality of second images based on a user input;
determining, in a second sequence, the plurality of second images from the plurality of first images based on the selection of the first region of interest and based on the acquired reproduction time,
wherein a first number of images in the plurality of first images is greater than a second number of images in the plurality of second images; and
controlling a display device to display the plurality of second images in the second sequence.

17. A system, comprising:
a microscope; and
an image processing apparatus that comprises at least one processor configured to:
control the microscope to acquire a first sequence of a plurality of first images of a plurality living objects,
wherein each of the plurality of first images includes a first region of interest and a second region of interest;
determine at least one image from the plurality of first images is a bright-field image;
determine edge parts in the at least one image based on the determination that the at least one image is the bright-field image;
set the determined edge parts as the first region of interest;
select the first region of interest from each of the plurality of first images;
acquire a reproduction time of a plurality of second images based on a user input;
determine, in a second sequence, the plurality of second images from the plurality of first images based on the selection of the first region of interest and based on the acquired reproduction time,
wherein a first number of images in the plurality of first images is greater than a second number of images in the plurality of second images; and
control a display device to display the plurality of second images in the second sequence.

18. The system of claim 17, further comprising the display device.

19. A non-transitory computer-readable medium having stored thereon, computer-executable instructions which, when executed by a computer, cause the computer to execute operations, the operations comprising:
controlling microscopy of a plurality of living objects;
acquiring a first sequence of a plurality of first images of the plurality of living objects, based on the microscopy of the plurality of living objects,
wherein each of the plurality of first images includes a first region of interest and a second region of interest;
determining at least one image from the plurality of first images is a bright-field image;
determining edge parts in the at least one image based on the determination that the at least one image is the bright-field image;
setting the determined edge parts as the first region of interest;
selecting the first region of interest from each of the plurality of first images;
acquiring a reproduction time of a plurality of second images based on a user input;
determining, in a second sequence, the plurality of second images from the plurality of first images based on the selection of the first region of interest and based on the acquired reproduction time,
wherein a first number of images in the plurality of first images is greater than a second number of images in the plurality of second images; and
controlling a display device to display the plurality of second images in the second sequence.

20. An apparatus, comprising:
at least one processor; and
a storage unit configured to store executable instructions for the at least one processor,
wherein the at least one processor is configured to:
control microscopy of a plurality of living objects;

acquire a first sequence of a plurality of first images of the plurality of living objects, based on the microscopy of the plurality of living objects,
  wherein each of the plurality of first images includes a first region of interest and a second region of interest;
select the first region of interest from each of the plurality of first images;
acquire a reproduction time of a plurality of second images based on a user input;
adjust a threshold value of a parameter associated with the plurality of first images, based on the acquired reproduction time, wherein the threshold value is inversely proportional to the reproduction time;
determine, in a second sequence, the plurality of second images from the plurality of first images based on the adjusted threshold value of the parameter, the selection of the first region of interest, and the acquired reproduction time,
  wherein a first number of images in the plurality of first images is greater than a second number of images in the plurality of second images; and
control a display device to display the plurality of second images in the second sequence.

* * * * *